(12) United States Patent
Wu et al.

(10) Patent No.: US 8,972,754 B2
(45) Date of Patent: Mar. 3, 2015

(54) COMPUTER DEVICE AND FREQUENCY ADJUSTING METHOD FOR CENTRAL PROCESSING UNIT

(75) Inventors: Li-Chien Wu, Taipei (TW); Yung-Lun Lin, Taipei (TW); Yi-Chun Tsai, Taipei (TW); Ji-Kuang Tan, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 241 days.

(21) Appl. No.: 13/594,891

(22) Filed: Aug. 27, 2012

(65) Prior Publication Data

US 2013/0067250 A1    Mar. 14, 2013

(30) Foreign Application Priority Data

Sep. 8, 2011   (TW) .............................. 100132449 A

(51) Int. Cl.
| | |
|---|---|
| G06F 1/24 | (2006.01) |
| G06F 15/177 | (2006.01) |
| G06F 1/26 | (2006.01) |
| G06F 1/08 | (2006.01) |

(52) U.S. Cl.
CPC ... *G06F 1/26* (2013.01); *G06F 1/08* (2013.01)
USPC .................... 713/300; 713/1; 713/2; 713/100

(58) Field of Classification Search
USPC .......................................... 713/300, 100, 2, 1
See application file for complete search history.

(56) References Cited

U.S. PATENT DOCUMENTS

| | | | | |
|---|---|---|---|---|
| 5,727,208 | A * | 3/1998 | Brown .......................... | 713/100 |
| 5,862,351 | A * | 1/1999 | He ................. | 710/104 |
| 5,951,681 | A * | 9/1999 | Chang ................. | 713/1 |
| 6,327,663 | B2 * | 12/2001 | Isaac et al. ..................... | 713/300 |
| 6,457,137 | B1 | 9/2002 | Mitchell et al. | |
| 6,574,739 | B1 | 6/2003 | Kung et al. | |
| 6,874,083 | B2 * | 3/2005 | Sarangi et al. ................ | 713/100 |
| 7,020,788 | B2 | 3/2006 | Catherwood | |
| 7,930,569 | B2 * | 4/2011 | Brown et al. .................. | 713/300 |
| 2002/0144036 | A1 * | 10/2002 | Osburn et al. ................. | 710/104 |
| 2003/0110423 | A1 | 6/2003 | Helms et al. | |
| 2004/0128090 | A1 | 7/2004 | Read et al. | |
| 2008/0129274 | A1 * | 6/2008 | Komaki ........................ | 323/318 |
| 2009/0256541 | A1 * | 10/2009 | Akyildiz et al. .............. | 323/283 |
| 2009/0327569 | A1 * | 12/2009 | Titone et al. .................. | 710/309 |

FOREIGN PATENT DOCUMENTS

CN    101251763    8/2008

* cited by examiner

*Primary Examiner* — Vincent Tran
(74) *Attorney, Agent, or Firm* — Jianq Chyun IP Office

(57) ABSTRACT

A computer device and frequency adjusting method for central processing unit are provided. The computer device including a CPU, a voltage regulator module, a clock generator, a power-on module, a chip set and an embedded controller. The power-on module activates the voltage regulator module, the clock generator and the CPU respectively. The voltage regulator module provides the operating voltage of the CPU. The clock generator provides the operating clock of the CPU. Before the CPU is activated, the embedded controller adjusts the operating clock and the operating voltage provided from the clock generator and the voltage regulator module the CPU, the CPU performs overclocking/downclocking directly by using the adjusted operating clock and the adjusted operating voltage after the CPU is activated.

8 Claims, 4 Drawing Sheets

COMPUTER DEVICE AND FREQUENCY ADJUSTING METHOD FOR CENTRAL PROCESSING UNIT

CROSS-REFERENCE TO RELATED APPLICATION

This application claims the priority benefit of Taiwan application serial no. 100132449, filed on Sep. 8, 2011. The entirety of the above-mentioned patent application is hereby incorporated by reference herein and made a part of this specification.

BACKGROUND OF THE INVENTION

1. Field of the Invention

This invention is related to a computer device, and particularly related to a frequency adjusting method for central processing unit (CPU).

2. Description of Related Art

With the development of the modern computer manufacturing technology nowadays, the overclocking technique for computers may simply be classified into the following two methods: setting overclocking in BIOS setting mode, or setting dynamic overclocking under use of an operating system. However, regardless of which overclocking technique is applied, at power-on, CPU is still activated and checked based on the operating frequency previously set. The operating frequency of the CPU may only be adjusted when BIOS is performing overclocking process or under use of an operating system. Since the operating parameters may not be provided to CPU instantly and stably, problems of unstable CPU may occur in the practical use, as a result, the computer may crash frequently during overclocking process.

In addition, a required operating clock for CPU which is provided by the clock generator may be difficult to substantially adjust the frequency after the computer device is being powered up. Therefore, users may face the problem of repeatedly restarting the computer device if they wish to substantially adjust the operating parameters of CPU.

SUMMARY OF THE INVENTION

The present disclosure provides a computer device, the computer device sets the operating parameters before the CPU is activated, allowing the computer device to power-on the system stably.

In addition, the present disclosure provides a frequency adjusting method for a CPU, the frequency adjusting method performs setting to the operating parameters of the CPU in the power-on sequence, allowing the CPU to perform overclocking/downclocking by using the adjusted operating clock and the adjusted operating voltage after the CPU is activated.

The present disclosure provides a computer device, the computer device includes a CPU, a voltage regulator module, a clock generator, a power-on module, a chip set and an embedded controller. The CPU receives an operating voltage and an operating clock. The voltage regulator module is coupled to the CPU, and the voltage regulator module provides the operating voltage of the CPU. The clock generator is coupled to the CPU, and the clock generator provides the operating clock of the CPU. The power-on module respectively activates the voltage regulator module, the clock generator and the CPU. The chip set is coupled to the CPU and the power-on module. The embedded controller is coupled to the voltage regulator module, the clock generator and the chip set. The embedded controller adjusts the voltage regulator module and the clock generator, the embedded controller sets the operating voltage and the operating clock of the CPU after the voltage regulator module and the clock generator are activated and adjusted, and before the CPU is activated.

In one embodiment of the present disclosure, the embedded controller receives a voltage ready signal of the voltage regulator module and a clock ready signal of the clock generator, and when the voltage ready signal and the clock ready signal are enabled, the embedded controller holds one of the clock ready signal or the voltage ready signal, and sets a new operating voltage and a new operating clock to the clock generator and the voltage regulator module. Further, after the operating voltage and the operating clock are set, the embedded controller releases the held clock ready signal or the held voltage ready signal, and an activate signal is sent from the chip set to the CPU to reset the CPU, allowing the CPU to perform overclocking/downclocking by directly using the adjusted operating clock and the adjusted operating voltage.

In one embodiment of the present disclosure, the computer device further includes a memory unit. The memory unit is coupled to the embedded controller, and the embedded controller sets the operating voltage and the operating clock of the CPU according to a default operating voltage and a default operating frequency in the memory unit.

In one embodiment of the present disclosure, the power-on module includes a power supply unit and a power-on sequence module. The power supply unit provides multiple primarily voltages to the computer device. The power-on sequence module is coupled to the power supply unit, and the power-on sequence controls the power supply unit for providing the primarily voltages according to a power signal and a power-on sequence.

On the other hand, the present disclosure provides a frequency adjusting method for a CPU, the frequency adjusting method is suitable for a computer having the CPU. The frequency adjusting method includes the following step: activating a voltage regulator module and a clock generator. Receiving and holding the voltage ready signal and the clock ready signal returned by the voltage regulator module and the clock generator. Adjusting the operating voltage and the operating clock of the voltage regulator module and the clock generator before the CPU is activated.

In one embodiment of the present disclosure, the frequency adjusting method further includes the following step: activating the CPU and performing overclocking/downclocking control to the CPU after the operating voltage and the operating clock are set.

In one embodiment of the present disclosure, the frequency adjusting method further includes the following steps: receiving the voltage ready signal of the voltage regulator module and the clock ready signal of the clock generator. Holding one of the clock ready signal or the voltage ready signal, and setting said operating voltage and said operating clock. Providing the held clock ready signal and the held voltage ready signal after the operating voltage and the operating clock are set.

In view of above, In the computer device of embodiment of the present disclosure, the embedded controller sets the operating parameters (for example, the operating voltage and the operating frequency) of the CPU before the CPU is reset, the computer device performs reset to the CPU after the operating parameters are set. Thereby, when the CPU is reset in the power-on sequence, the CPU may obtain an operating voltage and an operating clock which are stable and overclocked/downclocked, allowing the stability of the computer device during the power-on process. Further, since no overclocking is performed during the relative process of system power-on, the range for adjusting the operating parameters in the CPU may be substantially extended.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
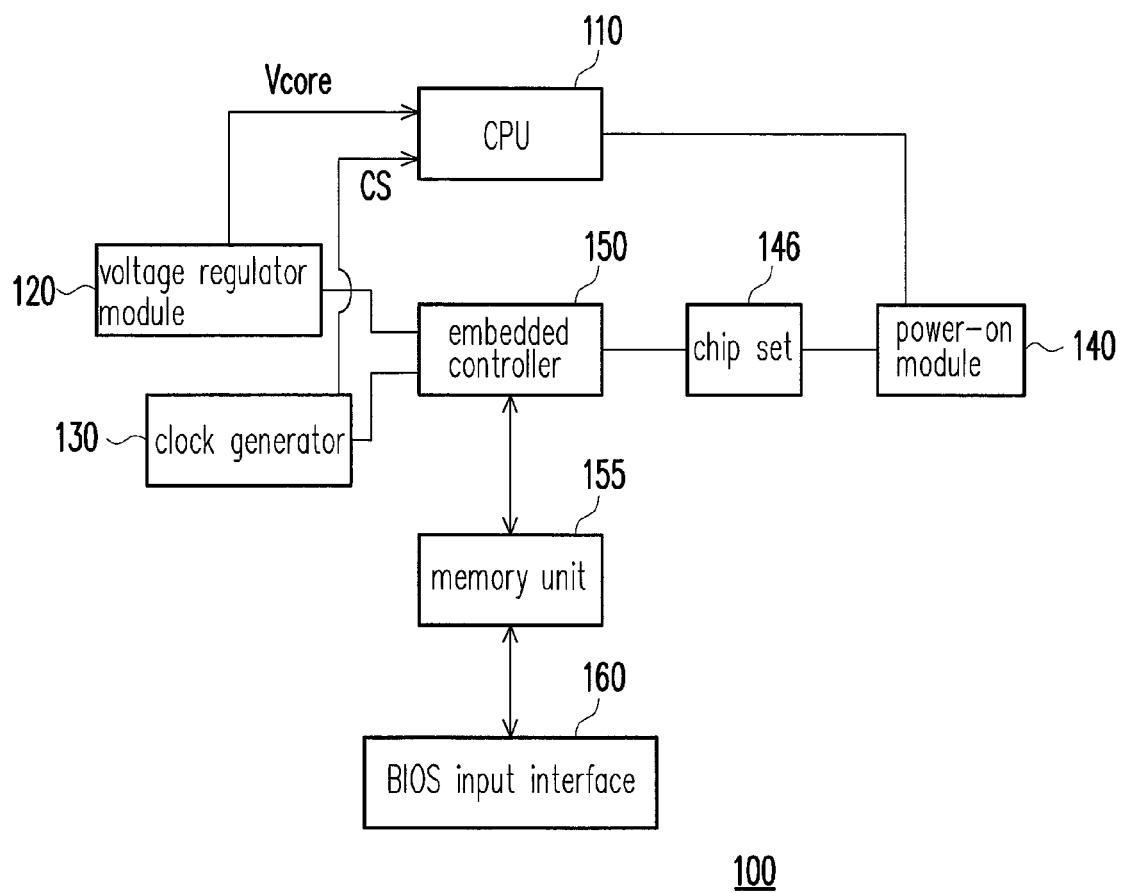
FIG. 1 is a block diagram illustrating a computer device according to the first embodiment of the present disclosure.

Descriptions of the invention are given with reference to the exemplary embodiments illustrated with accompanied drawings, wherein same or similar parts are denoted with same reference numerals. Moreover, elements/components/notations with same reference numerals represent same or similar parts in the drawings and embodiments.

Referring to FIG. 1, FIG. 1 is a block diagram illustrating a computer device 100 according to the first embodiment of the present disclosure. As shown in FIG. 1, the computer device 100 includes a central processing unit (CPU) 110, a voltage regulator module (VRM) 120, a clock generator 130, a power-on module 140, a chip set 146 and an embedded controller (EC) 150. In this embodiment, the computer device 100 further includes a memory unit 155 and a basic input/output system (BIOS) input interface 160.

The computer device 100 of the present embodiment may be a computer device having a CPU, such as a desktop computer, a notebook computer or a tablet computer. The voltage regulator module 120 and the clock generator 130 may be mounted on the motherboard of the computer device 100. The voltage regulator module 120 is used to provide an operating voltage (Vcore) to the CPU 110. By adjusting the operating voltage (Vcore), the CPU 110 may perform overclocking/downclocking easier, while using higher operating clock for operation.

The clock generator 130 is used to provide an operating clock to devices with various functions (such as CPU 110, memory and bus). In this embodiment, the clock generator 130 provides an operating clock (CS) required for operation, to the CPU 110. The CPU 110 receives the operating voltage (Vcore) and the operating clock (CS) during reset, such that the computer device 100 may be favorably activated during power-on.

The chip set 146 denotes the chip set used on the computer device 100. In some of the embodiments, the chip set 146 is a general term of the south bridge chip and the north bridge chip. In this embodiment, the chip set 146 is coupled between the CPU 110 and the power-on module 140.

In this embodiment, users may set a default operating voltage and a default operating frequency of the CPU 110 through the BIOS input interface 160, and the BIOS input interface 160 stores said default operating voltage and said default operating frequency to the memory unit 155. The embedded controller 150 may adjust and set the operating voltage (Vcore) provided by the voltage regulator module 120 and the operating frequency (CS) provided by the clock generator 130, by using the default parameters stored in the memory unit 155. In other embodiments, the default operating voltage and the default operating frequency in the memory 155 may be set through the operating system of the computer device 100, or directly through BIOS (e.g. the BIOS input interface 160, the setting process thereof is omitted herein).

The memory unit 155 of the present embodiment may be implemented by applying a Radom Access Memory (RAM), Read-Only Memory (ROM) or other storage devices. In this embodiment, multiple sets of the default operating voltage and the default operating frequency may be stored in the memory unit 155. In addition, the embedded controller 150 may be implemented by a Complex Programmable Logic Device (CPLD) or a Field Logic Gate Array (FPGA).

Although each computer device 100 in each embodiment may be set with a different power-on sequence to one another, but CPU 110 is usually at the last position of the power-on sequence. This is because once the CPU 110 is activated, the CPU 110 is then proceed to the next power-on process, for example, the execution of Power On Self Test (POST) process in BIOS. Therefore, it can be known that during the power-on sequence, before the CPU 110 is reset, the voltage regulator module 120 and the clock generator 130 are activated and an operating voltage (Vcore) and an operating clock (CS) are provided to the CPU 110.

In view of above, during the process of power-on sequence in the present embodiment, after the operating voltage (Vcore) of the voltage regulator module 120 and the operating clock (CS) of the clock generator 130 are adjusted by the embedded controller 150, and before the CPU 110 is activated, the voltage regulator module 120 and the clock generator 130 may be adjusted to preset the operating voltage (Vcore) and the operating clock (CS), such that the CPU 110 may perform overclocking/downclocking by using the adjusted operating clock and the adjusted operating voltage after reset. In this embodiment, the CPU 110 may be activated by using a reset method. Therefore, the abovementioned "before the CPU 110 is activated" may also refer to as "before the CPU 110 is reset".

In addition, since the operating voltage (Vcore) and the operating frequency (CS) are preset before the CPU 110 is activated, the range for adjusting the operating parameters (the operating voltage (Vcore) and the operating frequency (CS)) may be substantially extended, as to overcome the problem of the computer device 100 (that is, not being able to substantially adjust the parameters) during operation.

Figure 2:
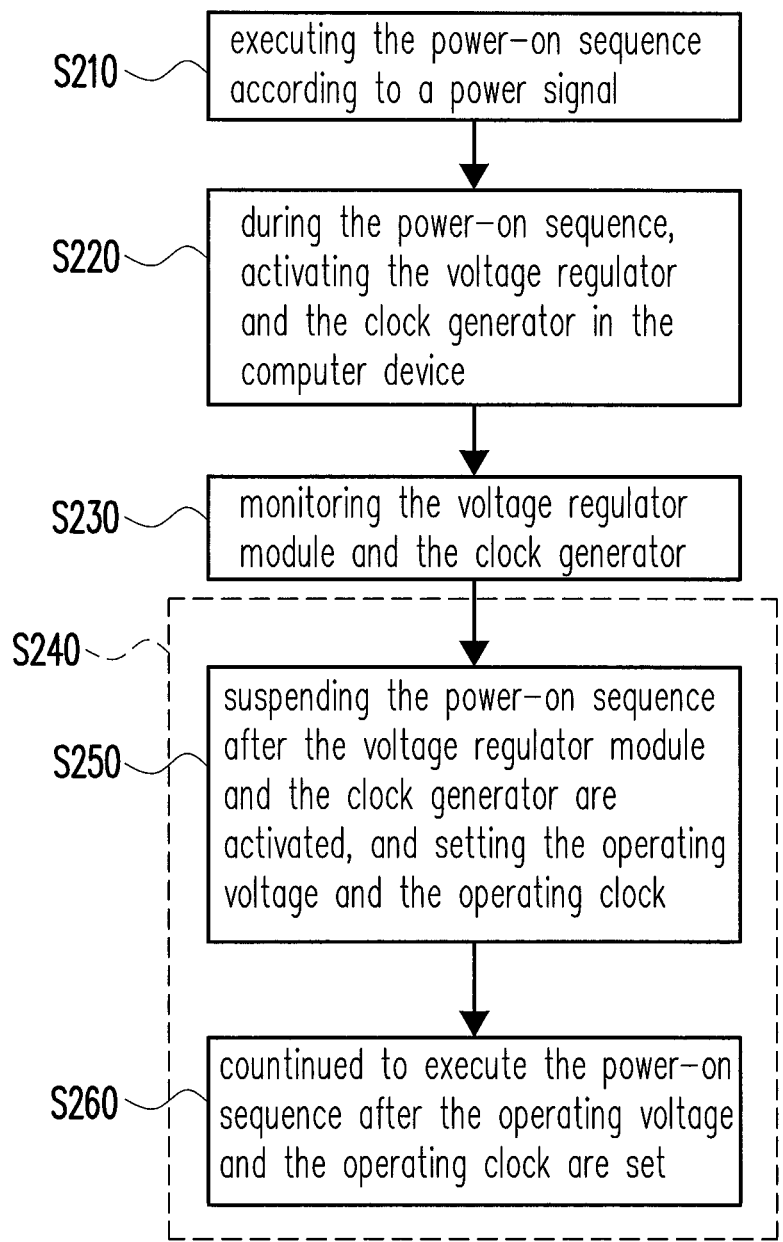
FIG. 2 is a flowchart illustrating a frequency adjusting method for central processing unit according to the first embodiment of the present disclosure.

FIG. 2 is a flowchart illustrating a frequency adjusting method for central processing unit according to the first embodiment of the present disclosure, referring to both FIG. 1 and FIG. 2 together. First, in the step S210, when a power-on signal is generated by users through power-on events (for example, by pressing a power button on the computer device 100) for performing a power-on process and a restarting process to the computer device 100, a power-on sequence is executed by the power-on module 140 and the chip set 146 according to said power-on signal, so each of the elements in the computer device 100 is activated/restarted progressively (for example, respectively activates the voltage regulator module 120, the clock generator 130 and the CPU 110).

In the step S220, during the power-on sequence, the power-on module 140 and the chip set 146 sequentially activate the voltage regulator module 120 and the clock generator 130. Moreover, in the step S230, the embedded controller 150 monitors the activate statuses of the voltage regulator module 120 and the clock generator 130. In the step S240, once the voltage regulator module 120 and the clock generator 130 are activated, while the operating voltage (Vcore) outputted from the voltage regulator module 120 and the operating frequency (CS) outputted from the clock generator 130 are adjusted and set by the embedded controller 150 using the default parameters stored in the memory unit 155, the embedded controller 150 may set the potential of the operating voltage (Vcore) and the frequency of the operating clock (CS) according to the default parameters stored in the memory unit 155, before the CPU 110 is activated.

The detail steps within the step S240 is described hereinafter. In the step S250, once the voltage regulator module 120 and the clock generator 130 are activated and adjusted, the power-on sequence is suspended by the embedded controller 150, and the voltage regulator module 120 and the clock generator 130 are adjusted by using the default operating voltage and the default operating frequency stored in the memory 155, thereby setting the operating voltage (Vcore) and the operating clock (CS). After the operating voltage (Vcore) and the operating clock (CS) are set, the power-on sequence is released by the embedded controller 150, such that the power-on module 140 may be continued to execute the power-on sequence.

Figure 3:
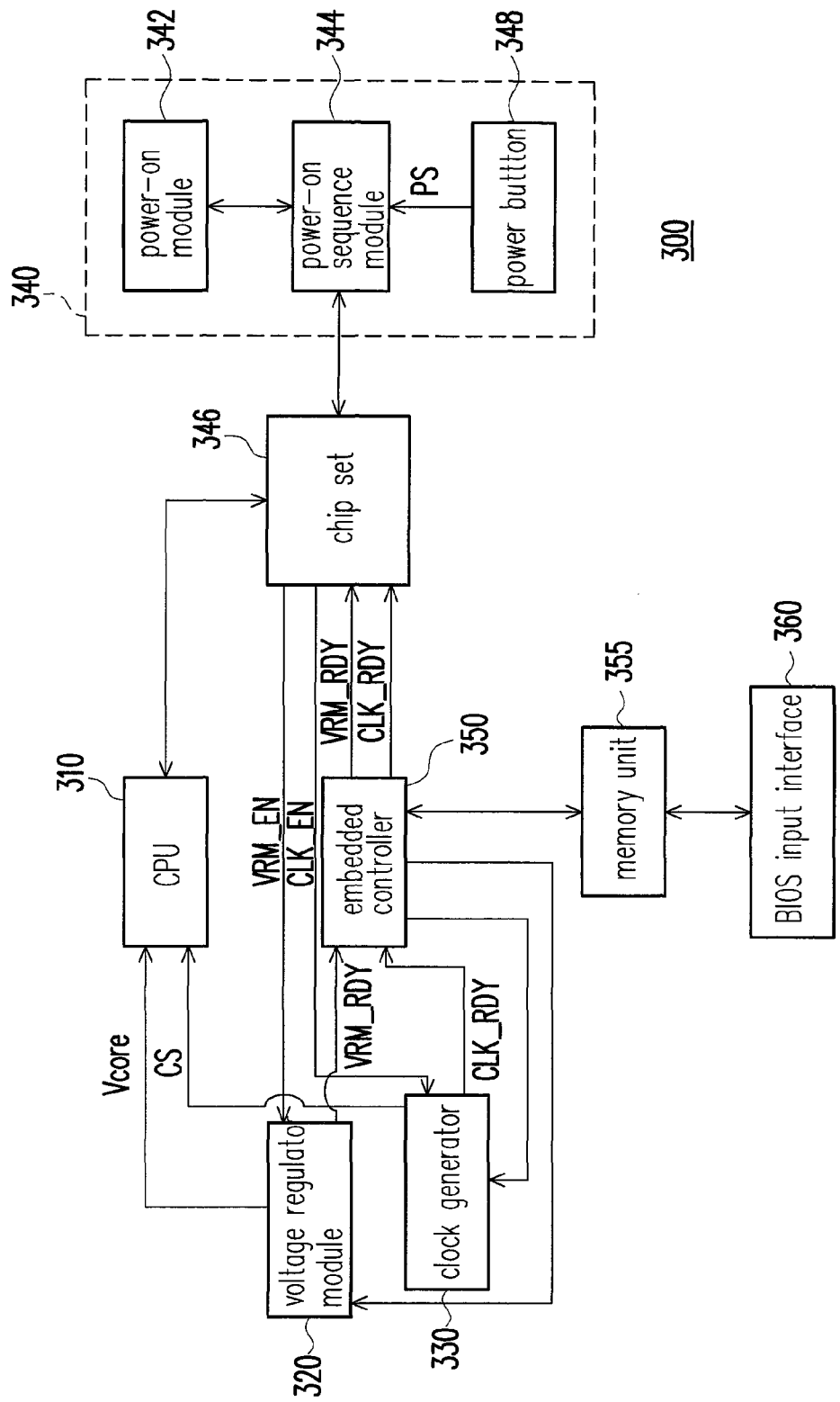
FIG. 3 is a block diagram illustrating a computer device according to the second embodiment of the present disclosure.

In order to implement the first embodiment of the present disclosure, a method for implementing the same is provided as follows. FIG. 3 is a block diagram illustrating a computer device 300 according to the second embodiment of the present disclosure. In FIG. 3, the computer device 300 includes a CPU 310, a voltage regulator module 320, a clock generator 330, a power-on module 340, a chip set 346, an embedded controller 350, a memory unit 355 and a BIOS input interface 360. Wherein, description related to the CPU 310, the voltage regulator module 320, the clock generator unit 330, memory 335 and the BIOS input interface 360 has been disclosed in the first embodiment above, and is omitted herein. The computer device 300 may also implement the CPU and the frequency adjusting method as illustrated in FIG. 2, hence some of the steps therein may refer to related description in the first embodiment.

In this embodiment, a power-on module 340 includes a power supply unit 342, a power-on sequence unit 344 and a power button 348. The power supply unit 342 is used to provide multiple primarily voltage to various devices (e.g., memories, chips, Input/Output units) in the computer device 300, and the primarily voltages may have different potentials such as 12V, 5V and 3.3V. In other embodiments, since some of the power supply unit 342 may also support the operation for adjusting the operating voltage (Vcore) of the CPU 310, the voltage regulator module 320 that fits the computer device 300 may also be placed in the power supply unit 342.

The power-on sequence module 344 is coupled to the power supply unit 342, and the power-on sequence module 344 is used to execute the power-on sequence according to a power signal (PS). In this embodiment, the power signal (PS) may be generated by users through touching the power button 348 of the computer device 300, or the power signal (PS) may be generated through other power-on processes. Once the power signal (PS) is received by the power-on sequence module 344 of the power-on module 340, the activate process of the main power is then executed to control the power supply unit 342 for generating main powers with different potentials. Once these main powers are in readiness, a device activate signal is outputted from the power-on sequence module 344.

The device activate signal is received by the chip set 346, and the chip set 346 progressively activates multiple devices which are under control of the chip set 346, for example, the voltage regulator module 320 and the clock generator 330.

While these devices are being progressively activated, a corresponding activate signal to each device is sequentially outputted from the chip set 346, and only after the previous device is activated and a ready signal is adjusted, such that the next device may be activated. For example, an activate signal of a first device is outputted from the chip set 346 to activate the first device. Moreover, the chip set 346 only outputs an activate signal to activate the next device after a ready signal corresponding to the first device is received.

The embedded controller 350 receives the voltage ready signal (VRM_RDY) generated by the voltage regulator module 320 and clock ready signal (CLK_RDY) generated by the clock generator 330, as to determine the activate statuses of the voltage regulator module 320 and the clock generator 330.

The precedence of activating the voltage regulator module 320 and the clock generator 330 in power-on sequence set by each manufacturer is not specifically regulated in particular. Therefore, it is assumed that in the power-on sequence of this present embodiment, a clock activate signal (CLK_EN) for activating the clock generator 330 is the first to be outputted from the chip set 346. The clock generator 330 outputs an enabled clock ready signal (CLK_RDY) once it is activated. The embedded controller 350 then confirms that the clock generator 330 is activated, however, the voltage regulator module 320 is still inactivated. In this case, the clock ready signal (CLK_RDY) is directly transmitted from the embedded controller 350 to the chip set 346.

Once the enabled clock ready signal (CLK_RDY) is received by the chip set 346, indicating that the clock generator 330 is now activated. Next, the chip set 346 is continued to output the voltage activate signal (VRM_EN), and waited to receive the voltage ready signal (VRM_RDY) enabled by the voltage regulator module 320. Therefore, the voltage regulator module 320 is activated after the voltage signal (VRM_EN) is received, and an enabled voltage ready signal (VRM_RDY) is outputted after the activation is completed.

In this case, the voltage ready signal (VRM_RDY) and the clock ready signal (CLK_RDY) are received by the embedded controller 350, indicating that the voltage regulator module 320 and clock generator 330 are both activated. Next, one of the voltage ready signal (VRM_RDY) and the clock ready signal (CLK_RDY) is held by the embedded controller 350, for example, a voltage ready signal that is enabled later, is held without transmitting to the chip set 346 in this embodiment, thereby suspending the power-on sequence which is executing by the computer device 300. In this embodiment, since the voltage regulator module 320 is activated later, once a voltage ready signal (VRM_RDY) and the clock ready signal (CLK_RDY) are received by the embedded controller 350, the voltage ready signal (VRM_RDY) is then held without transmitting to the chip set 346, thereby suspending the power-op sequence.

Also, the operating voltage (Vcore) and the operating clock (CS) are set by the embedded controller 350 through the default parameters stored in the memory 355. Once the operating voltage (Vcore) and the operating clock (CS) are set, the embedded controller 350 provides the clock ready signal (CLK_RDY) or the voltage ready signal (VRM_RDY) held to the chip set 346, for the chip set 346 and the power-on sequence module 344 to continue the execution of the power-on sequence.

Thereby, after the voltage ready signal (VRM_RDY) of the voltage regulator module 320 and the clock ready signal (CLK_RDY) of the clock generator 330 are received by the chip set 346, the chips set 346 and the power-on sequence module 344 are continued to execute the power-on sequence, until a CPU reset signal is outputted from the chip set 346 to reset the CPU 310.

Therefore, when the CPU 310 is reset for the first time, an adjusted operating voltage (Vcore) and an adjusted operating clock (CS) may be received by the CPU 310. Once the CPU 310 is activated and adjusted, the problem of the computer device 300 crashes due to unstable operating parameters may be prevented.

Figure 4:
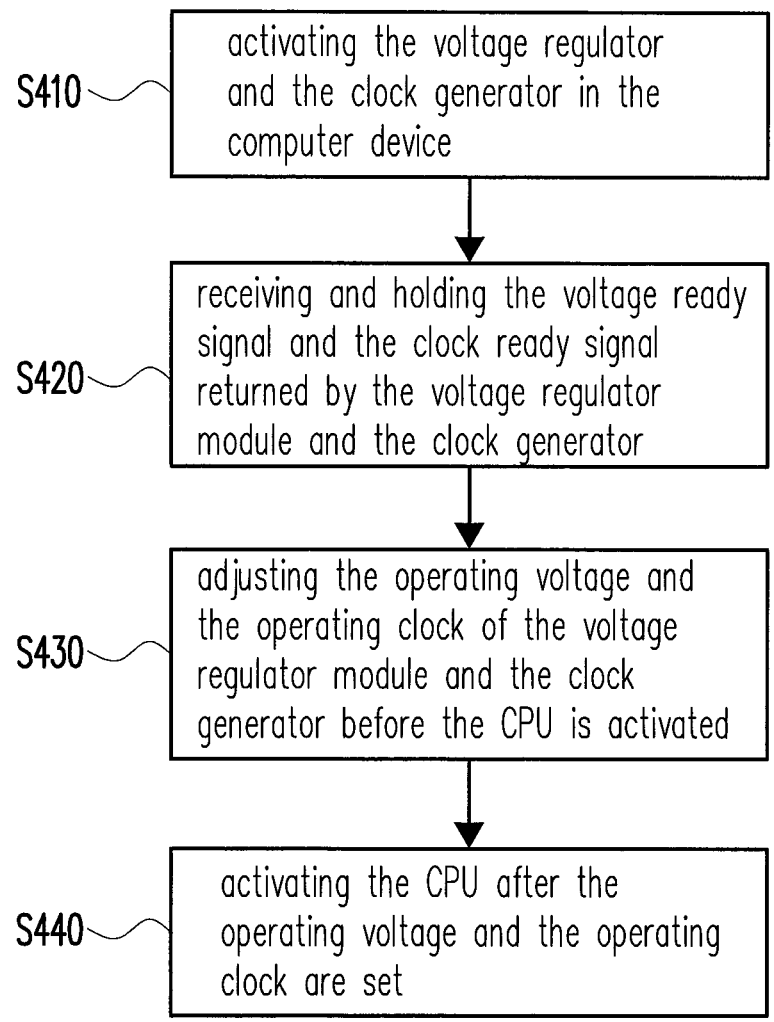
FIG. 4 is a flowchart illustrating a frequency adjusting method for central processing unit according to the second embodiment of the present disclosure.

In other words, the above steps may also be summarized into a flowchart as illustrated in FIG. 4. FIG. 4 is a flowchart illustrating a frequency adjusting method for central processing unit according to the second embodiment of the present disclosure. Referring to FIGS. 3 and 4, the frequency adjusting method is suitable for the computer device 300 having the CPU 310. In the step S410, the voltage regulator module 320 and the clock generator 330 in the computer 300 is sequentially activated by the power-on module 340 and the chip set 346, and the voltage ready signal (VRM_RDY) and the clock ready signal (CLK_RDY) are respectively outputted from the voltage regulator module 320 and the clock generator 330 after activation.

In the step S420, the voltage ready signal (VRM_RDY) and the clock ready signal (CLK_RDY) returned by the voltage regulator module 320 and the clock generator 330 are received and held by the embedded controller 350, for example, one of the voltage ready signal (VRM_RDY) or the clock ready signal (CLK_RDY) is held by the embedded controller 350. Further, in the step S430, the voltage regulator module 320 and the clock generator 330 is adjusted by the embedded controller 350 before the CPU 310 is activated, thereby setting the operating voltage (Vcore) and the operating clock (CS).

Next, in the step S440, the voltage ready signal (VRM_RDY) or the clock ready signal (CLK_RDY) is released after the operating voltage (Vcore) and the operating clock (CS) is set by the embedded controller 350, and once one of the voltage ready signal (VRM_RDY) or the clock ready signal (CLK_RDY) released by the embedded controller 350 is received by the chip set 346, a signal is transmitted by the chip set 346 to activate the CPU 310. In this embodiment, the method to activate the CPU 110 is performed by resetting the CPU 110. In this embodiment, some of steps in this embodiment may refer to related description in the above-said embodiment, and are omitted herein.

In view of above, in the computer device of present embodiment, the embedded controller presets the operating parameters (e.g., the operating voltage and the operating frequency) of the CPU before the power-on sequence of the CPU is executed, and the power-on sequence of the CPU is only continued by the computer device once the setting is completed. Thereby, when the CPU is reset during the power-on sequence, an operating voltage and an operating clock that are stable and adjusted can be obtained by the CPU for overclocking/downclocking, allowing the computer device to maintain stability during the power-on process. In addition, since the overclocking/downclocking is set before the power-on of the CPU, rather than be performed during the power-on process of the system. In this case, the range for adjusting the operating parameter of the CPU may be substantially extended.

Although the disclosure have been described with reference to the above embodiments, it will be apparent to one of the ordinary skill in the art that modifications to the described embodiment may be made without departing from the spirit of the described embodiment. Accordingly, the scope of the disclosure will be defined by the attached claims not by the above detailed descriptions.

What is claimed is:

1. A computer device, comprising:
    a CPU, for receiving an operating voltage and an operating clock;
    a voltage regulator module, coupled to the CPU, providing the operating voltage;
    a clock generator, coupled to the CPU, providing the operating clock;
    a power-on module, respectively activates the voltage regulator module, the clock generator and the CPU;
    a chip set, coupled to the CPU and the power-on module;
    an embedded controller coupled to the voltage regulator module, the clock generator and the chip set, used for adjusting the voltage regulator module and the clock generator, and setting the operating voltage and the operating clock after the voltage regulator module and the clock generator are activated and before the CPU is activated; and
    wherein when a voltage ready signal of the voltage regulator module and a clock ready signal of the clock generator are received by the embedded controller, one of the clock ready signal or the voltage ready signal is held by the embedded controller, and the operating voltage of the CPU and the operating clock of the CPU are set.

2. The computer device of claim 1, wherein the CPU is reset after one of the clock ready signal or the voltage ready signal released from the embedded controller is received by the chip set.

3. The computer device of claim 1, wherein the voltage regulator module and the clock generator are sequentially activated by the chip set.

4. The computer device of claim 1, wherein the power-on module further comprising:
    a power supply unit, used for providing a plurality of primarily voltages to the computer device; and
    a power-on sequence module, coupled to the power supply unit, used for controlling the power supply unit to provide the plurality of primarily voltages according to a power signal and a power-on sequence.

5. The computer device of claim 1, further comprising:
    a memory unit, coupled to the embedded controller, the embedded controller sets the operating voltage and the operating clock of the CPU according to a default operating voltage and a default operating frequency in the memory unit.

6. A frequency adjusting method for a CPU, suitable for a computer device having the CPU, the frequency adjusting method for the CPU comprising:
    activating a voltage regulator module and a clock generator in the computer device;
    receiving and holding a voltage ready signal and a clock ready signal returned by the voltage regulator module and the clock generator; and
    adjusting an operating voltage and an operating clock of the voltage regulator module and the clock generator before the CPU is activated.

7. A frequency adjusting method for a CPU of claim 6, further comprising:
    activating the CPU after the operating voltage and the operating clock is set.

8. The frequency adjusting method for a CPU of claim 7, further comprising:
    receiving a voltage ready signal of the voltage regulator module and a clock ready signal of the clock generator;

holding one of the clock ready signal or the voltage ready signal, and setting the operating voltage and the operating clock; and providing the clock ready signal or the voltage ready signal after the operating voltage and the operating clock are set.

* * * * *